No. 729,350.

Patented May 26, 1903.

UNITED STATES PATENT OFFICE.

ROBERT LEONARD JENKS, OF LONDON, ENGLAND, ASSIGNOR TO GEORGE ARCHIBALD CLOWES, OF LONDON, AND ERNEST PAUL HATSCHEK, OF NEEDHAM MARKET, ENGLAND.

PROCESS OF MANUFACTURING DECOLORIZING AND CLARIFYING MATERIAL.

SPECIFICATION forming part of Letters Patent No. 729,350, dated May 26, 1903.

Application filed November 22, 1902. Serial No. 132,433. (No specimens.)

*To all whom it may concern:*

Be it known that I, ROBERT LEONARD JENKS, a subject of the King of Great Britain, residing at London, England, have invented a new and useful Process of Manufacturing Decolorizing and Clarifying Material, of which the following is a full, clear, and exact description.

This invention relates to a process for manufacturing materials to be used for decolorizing and clarifying tanning extracts and other liquids. At present this result is generally accomplished by the addition of coagulable albumen, which may or may not precipitate one or other of the constituents of the liquid under treatment. In either case the albumen is again separated as a coagulum by heating the liquid to the required degree of temperature. During coagulation or in settling an uncertain amount of coloring-matter is removed. Such a treatment is adopted, for example, with tannin extracts which are decolorized by albumen from various sources. This, however, precipitates an appreciable quantity of tannin and retains it when coagulated, so that the process of removing color entails a considerable loss of tannin, a loss which is minimized by the use of my material. This material is a practically non-coagulable substance, nearly neutral to tannic acid, and consists of dead yeast-cells the contents of which have been largely removed by any suitable process; but by the treatment hereinafter described the yeast-cells behave efficiently as a decolorizing agent.

Any suitable yeast is mixed with water to a suitable consistence, and is then heated to and kept at a temperature of about 50° centigrade, preferably *in vacuo*, for several hours, so as to kill the yeast and to remove any gum and other soluble matter adhering to the cells. The liquid thus obtained is run off, and the residue of dead yeast-cells is then digested with water containing about one per cent. of hydrochloric or other suitable mineral acid, again preferably *in vacuo*, which dilute acid extracts some of the nitrogenous contents of the yeast-cells and is run off, or it may be treated to recover the dissolved albuminous material. The residue of partly-emptied yeast-cells is then digested again, preferably *in vacuo*, with an alkaline solution containing about one per cent. of sodium or potassium hydroxid which dissolves further portions of the contents of the yeast-cells not acted upon by the dilute acid.

As the presence of free alkali or albuminous material in an alkaline condition is undesirable for most applications of the product, the residue from the last operation is again treated with dilute mineral acid for a short time and is then washed with water.

The resulting product forms a paste, which may be concentrated at low temperatures to any desired consistence or may be desiccated to dryness.

I wish to be clearly understood that while the above-described process of treating yeast is suitable for my purpose, I do not limit myself to the use of a material obtained from untreated yeast. Yeast treated so as to furnish nutritive or other extracts leaves a residue, which by applying the later stages of the process indicated above may be used as a decolorizer, and I expressly contemplate the utilization of such residues for the manufacture of my material for decolorizing purposes. It has the power of removing organic coloring-matter contained in solutions and may therefore be employed for decolorizing tannin extracts made from barks, woods, leaves, or other parts of plants, for clarifying fermented liquors, and in other cases where a solution containing organic coloring-matters has to be decolorized or clarified.

What I claim as my invention, and desire to secure by Letters Patent, is—

1. The process of manufacturing a material to be used for decolorizing and clarifying tanning extracts and other liquids, which consists of, first, mixing yeast with water, second, heating same to about 50° centigrade and keeping same heated for several hours, third, running off the liquid, fourth, digesting the dead yeast-cells with water containing one per cent. mineral acid, fifth, running off the water, sixth, again digesting the residue with an alkaline solution, seventh, and again treating the residue with a dilute acid for a short time, substantially as set forth.

2. The process for manufacturing a material to be used for decolorizing and clarifying tanning extracts and other liquids, which consists in digesting dead yeast-cells, which have been partially deprived of their contents, with an alkaline solution, treating the residue with a dilute acid for a short time and finally washing with water, substantially as set forth.

In witness whereof I have hereunto set my hand in the presence of two witnesses.

R. L. JENKS.

Witnesses:
    CLAUDE K. MILLS,
    WM. GIRLING.